United States Patent
Nakano et al.

(10) Patent No.: US 8,843,934 B2
(45) Date of Patent: Sep. 23, 2014

(54) INSTALLING AND EXECUTING NEW SOFTWARE MODULE WITHOUT EXCEEDING SYSTEM RESOURCE AMOUNT

(75) Inventors: Masaki Nakano, Machida (JP); Shinichiro Kawasaki, Kamakura (JP)

(73) Assignee: Hitachi, Ltd., Tokyo (JP)

(*) Notice: Subject to any disclaimer, the term of this patent is extended or adjusted under 35 U.S.C. 154(b) by 357 days.

(21) Appl. No.: 13/124,917

(22) PCT Filed: Oct. 2, 2009

(86) PCT No.: PCT/JP2009/067241
§ 371 (c)(1),
(2), (4) Date: Apr. 19, 2011

(87) PCT Pub. No.: WO2010/050335
PCT Pub. Date: May 6, 2010

(65) Prior Publication Data
US 2011/0202928 A1   Aug. 18, 2011

(51) Int. Cl.
*G06F 9/46* (2006.01)
*G06F 9/50* (2006.01)

(52) U.S. Cl.
CPC .................................. *G06F 9/5011* (2013.01)
USPC .......................................................... 718/104

(58) Field of Classification Search
CPC ................................ G06F 9/5011; G06F 8/61
See application file for complete search history.

(56) References Cited

U.S. PATENT DOCUMENTS

| | | | |
|---|---|---|---|
| 8,341,622 B1* | 12/2012 | Eatough | 717/177 |
| 2002/0107879 A1* | 8/2002 | Arnold et al. | 707/206 |
| 2004/0078686 A1* | 4/2004 | Toyooka et al. | 714/38 |
| 2004/0143664 A1 | 7/2004 | Usa et al. | |
| 2006/0048159 A1* | 3/2006 | Yazawa et al. | 718/104 |
| 2006/0143325 A1 | 6/2006 | Taniguchi et al. | |
| 2006/0150190 A1* | 7/2006 | Gusler et al. | 718/105 |
| 2007/0174716 A1* | 7/2007 | Erdtmann et al. | 714/39 |
| 2007/0174839 A1 | 7/2007 | Takahashi et al. | |
| 2008/0141283 A1 | 6/2008 | Minemura et al. | |

(Continued)

FOREIGN PATENT DOCUMENTS

| | | |
|---|---|---|
| CN | 101103335 A | 1/2008 |
| JP | 09-274576 A | 10/1997 |

(Continued)

OTHER PUBLICATIONS

G. Back et al., Processes in KaffeOS: Isolation, Resource Management, and Sharing in Java, USENIX Symposium OSDI 2000, Oct. 23-25, 2000.

(Continued)

*Primary Examiner* — Meng An
*Assistant Examiner* — James J Lee
(74) *Attorney, Agent, or Firm* — Mattingly & Malur, PC

(57) ABSTRACT

Provided is a resource management method in a system which individually limits a resource amount used by a software module (143) and adjusts the total of the maximum resource amounts used by respective software modules to be smaller than the entire system resource amount. When installing or executing a new software module, step 406 checks whether a software module group already installed or being executed is stably operating according to an execution history thereof; and step 407 checks whether to enable the installation or execution by including the maximum actual resource use value in the total from the execution history.

6 Claims, 4 Drawing Sheets

(56) References Cited

U.S. PATENT DOCUMENTS

2008/0263397 A1* 10/2008 Lutz et al. .................. 714/25
2008/0320483 A1* 12/2008 Hou et al. .................. 718/104
2010/0122257 A1   5/2010 Wada

FOREIGN PATENT DOCUMENTS

| JP | 2000-29336 A | 10/2000 |
|---|---|---|
| JP | 2003-84991 A | 3/2003 |
| JP | 2004-199561 A | 7/2004 |
| JP | 2006-39877 A | 2/2006 |
| JP | 2006-107197 A | 4/2006 |
| JP | 2006-209735 A | 8/2006 |
| JP | 2007-199811 A | 8/2007 |
| JP | 2008-186167 A | 8/2008 |
| JP | 2009-134379 A | 6/2009 |

OTHER PUBLICATIONS

Chinese Office Action received in Chinese Application No. 200980142710 dated Dec. 4, 2012.

* cited by examiner

RESOURCE INFORMATION TABLE

| MODULE IDENTIFIER | EXECUTION TIME | LAST TIME OF MEMORY MOVEMENT | MAXIMUM VALUE OF MEMORY USE AMOUNT | MEMORY LIMIT VALUE |
|---|---|---|---|---|
| MODULE A | 21325sec | 2008/06/07 23:21:21 | 100KB | 500KB |
| MODULE B | 31358sec | 2008/08/07 21:11:01 | 500KB | 1MB |
| MODULE C | 1523sec | 2008/07/03 11:31:51 | 1MB | 2MB |
| MODULE D | 2356sec | 2008/07/05 15:21:55 | 2MB | 5MB |
| MODULE E | 0sec | - | 0KB | 5MB |

INSTALLING AND EXECUTING NEW SOFTWARE MODULE WITHOUT EXCEEDING SYSTEM RESOURCE AMOUNT

The present application is the U.S. National Phase of International Application No. PCT/JP2009/067241, filed on Oct. 2, 2009, which claims the benefit of Japanese Patent Application No. 2008-275145, filed Oct. 27, 2008, the entire contents of which are hereby incorporated by reference.

TECHNICAL FIELD

The present invention relates to a resource management method and embedded device of computer systems, and more specifically, relates to a resource management method for computer systems having limited amount of resources, such as so-called embedded devices.

BACKGROUND ART

Recently, the functions of information processing devices so-called embedded devices such as home information appliances and cellular phones are increasing at an accelerated pace. Causes of such accelerated increase of functions are the upgrading of user demands, competitions among manufacturers, and compatibility with the network. In order to respond to such increase of functions, the softwares being installed in embedded devices have become complex, along with which the management of resources used for the operation of such software has also become complex.

For example, in embedded devices realizing the overall functions of the device by combining a plurality of software modules for realizing the respective functions (hereinafter called modules), the modules scramble for resources, causing exhaustion of resources, which may lead to failures such as shutdown. It maybe possible to prevent such resource failures through careful development operations, but such development requires much time and causes increase of costs, which becomes a serious problem.

Further, the progress in the network connection of embedded devices has increased systems that enable the embedded devices to receive modules and execute the received modules. For example, an OSGi (registered trademark) which is a platform technology aimed at enabling functions of various deices to be altered easily through transmission and reception of software components via the network has determined standards for transmitting modules to home gateways installed in respective homes. Generally, there are a large variety of modules transmitted via such systems, and the amounts of use of resources via these modules are also varied. Therefore, the distribution and execution of modules using large amounts of resources may cause the exhaustion of resources of the respective embedded devices.

In order to cope with such problems mentioned above, there are many known methods for monitoring and controlling the used amount of resources per module. One such typical method sets up a limit value of the amount of resources used per module, and forbids the use of resources exceeding a certain amount. For example, patent document 1 teaches a resource management system that limits the amount of resources to be used by the whole system and modules, in order to prevent failures such as shutdown caused by exhaustion of resources.

Further, non-patent document 1 teaches a method for restricting the amount of memory used by each module by dividing the memory regions and relating the divided regions with the modules. In further detail, the document illustrates a method for providing a divided region dedicated to a shared memory, and limiting the amount of shared memory.

CITED REFERENCES

Patent Document

[Patent Document 1] Japanese patent application laid-open publication No. 2006-209735

Non-Patent Document

[Non-Patent Document 1] Godmar Back, Wilson C. Hsieh, Jay Lepreau; Processes in KaffeOS: Isolation, Resource Management, and Sharing in Java; USENIX Symposium OSDI 2000, Oct. 23-25, 2000.

SUMMARY OF THE INVENTION

Problem to be Solved by the Invention

However, the modules do not always consume resources to their maximum limit values. The amount of resources actually used by the modules vary according to the structure of modules being executed in the system or the way in which the user uses the device, so that the limit values set for the respective modules must have certain allowances. Therefore, if the modules are executed by limiting the total of the limit values of the respective modules to be smaller than the absolute amount of resources of the overall system, a problem arises in that the number of modules that can be executed is restricted even though the amount of resources in the whole system has enough capacity.

For example, the prior art system disclosed in non-patent document 1 requires the memory space to be divided into small portions along with the increase in the number of modules, which leads to the generation of free space within the respective divided regions and the deterioration of the efficiency of use of the memory.

The object of the present invention is to solve the problems mentioned above by providing a resource management method and an embedded system which combines and executes a plurality of modules, capable of reducing the probability of a failure caused by the exhaustion of resources and realizing improved efficiency of use of resources.

Means for Solving the Problem

The major feature of the present invention is that when installing or executing a new software module, if the system determines that a software module group already installed or being executed is stably operating according to an execution history thereof, the maximum value of the actually used resource amount based on the execution history is included in the total instead of the resource use limit value set for each module, in order to determine whether to enable the installation or execution.

In other words, the present invention provides a resource management method of a system which individually limits a resource amount used by a software module and adjusts the total of maximum resource amounts used by respective software modules to be smaller than an entire system resource amount, wherein upon installing or executing a new software module, the method comprises a step for checking whether a software module group already installed or being executed is stably operating according to an execution history thereof, and a step for checking whether to enable the installation or execution by including a maximum actual resource use value in the total from the execution history.

Further, the present invention provides an embedded device which individually limits a resource amount used by a software module and adjusts the total of maximum resource amounts used by respective software modules to be smaller than an entire system resource amount, wherein upon installing or executing a new software module, the device comprises a means for checking whether a software module group already installed or being executed is stably operating according to an execution history thereof, and a means for checking whether to enable the installation or execution by including a maximum actual resource use value in the total from the execution history.

Effect of the Invention

The present invention realizes an effect to reduce the probability of failure caused by the exhaustion of resources and to improve the efficiency of use of resources especially in an embedded system having limited resources in an environment where the amounts of use of resources of the respective modules are restricted.

BEST MODE FOR CARRYING OUT THE INVENTION

Now, we will illustrate the best mode for carrying out the present invention.

We will describe the embodiments of the resource management method and the embedded device according to the present invention.

Embodiment 1

Figure 1:
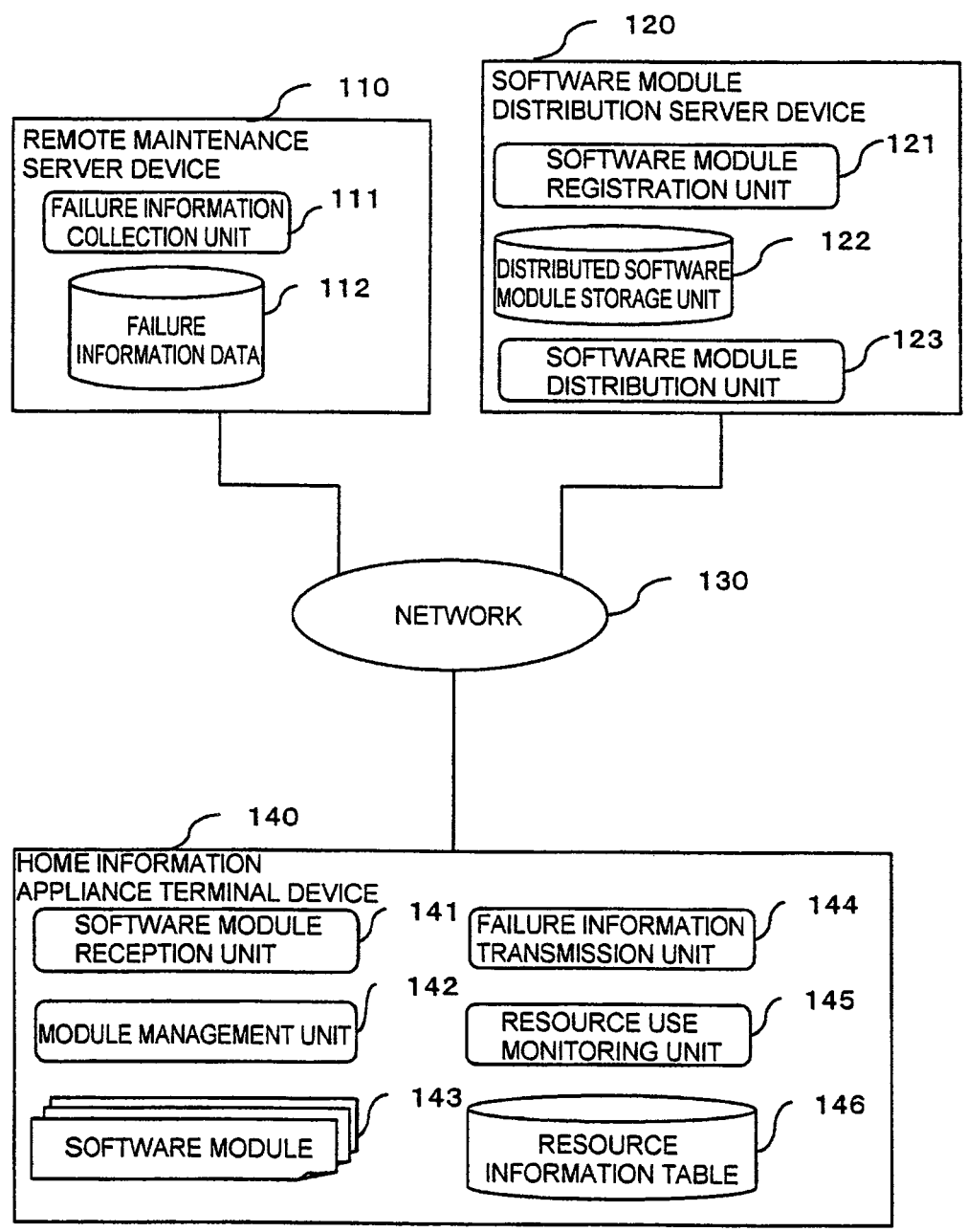
FIG. 1 is a system configuration diagram according to embodiment 1.

FIG. 1 is a system configuration diagram according to a first embodiment of the present invention. A remote maintenance server device 110 has a failure information collection unit 111 and a failure information data 112, and collects via the internet a failure information of software modules occurring in home information appliance terminal devices. A software module distribution server device 120 has a software module registration unit 121, a distributed software module storage unit 122 and a software module distribution unit 123, and distributes new software modules to home information appliance terminal devices 140. A home information appliance terminal device 140 has a software module reception unit 141, a module management unit 142, a software module 143, a failure information transmission unit 144, a resource use monitoring unit 145 and a resource information table 146. The software module reception unit 141 receives a software module from the software module distribution server device 120. The module management unit 142 determines whether to enable installation or execution of the module based on the data in the resource information table 146. There are a plurality of software modules 143 such as software modules received from the software module distribution server device 120 or software modules preinstalled in the home information appliance terminal device 140. The failure information transmission unit 144 sends the failure information occurred in the software module 143 to the remote maintenance server device 110. Especially, when failure occurrs due to resource exhaustion within a range not exceeding the resource limit value set in the software module 143, the failure information thereof is sent. Failure information is information to be used for specifying the cause of a failure occurring in a software module 143, such as logs, memory dumps, thread dumps and conditions of use of resources. The remote maintenance server device 110 performs necessary maintenance based on this information, such as the aborting, uninstalling and updating of software modules 143 operated on the home information appliance terminal device 110. The resource use monitoring unit 145 monitors the resources used by the software modules 143 and stores the maximum value of resource use amount in the resource information table 146.

Figures 2, 3:
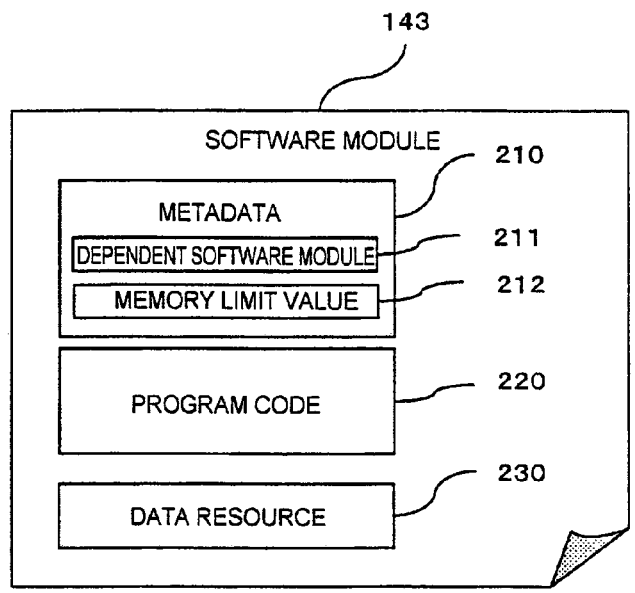
FIG. 2 is a view showing the details of a software module.
FIG. 3 is a view showing the data structure of a resource information table.

FIG. 2 shows the details of the software modules 143 illustrated in FIG. 1. The software modules 143 are stored in the distributed software module storage unit 122 and executed on the home information appliance terminal device 140. Each software module 143 is composed of a metadata 210, a program code 220 and a data resource 230. The metadata 210 stores necessary information related to the installation and execution of the software module 143, and stores information on a dependent software module 211 required for executing the software module 143 and a memory limit value 212. More than zero dependent software modules 211 are designated. A program code 220 is a code executed in the home information appliance terminal device 140. A data resource 230 is data such as images used by the program code 220.

FIG. 3 shows a data structure of the resource information table 146 illustrated in FIG. 1. The module management unit 142 checks the resource information table 146 and determines whether to enable the installation or execution of a software module. Reference number 301 refers to an identifier for uniquely identifying a software module. An execution time 302 is the total execution time from when the software module has been installed. A last time of memory movement 303 refers to the final time at which the memory region used by the software module has been moved via garbage collection. A maximum value of memory use amount 304 is the maximum amount of memory to be used from when the software module has been installed. A memory limit value 305 is the limit value of usable amount of memory set in the software module. The memory limit value 305 can be factory-installed in the home information appliance terminal device 140, or updated via the remote maintenance server device 110, or included in the software module being received. A row vector 307 can be factory-installed, or added during installing of a software module, or added via the remote maintenance server device 110.

Figure 4:
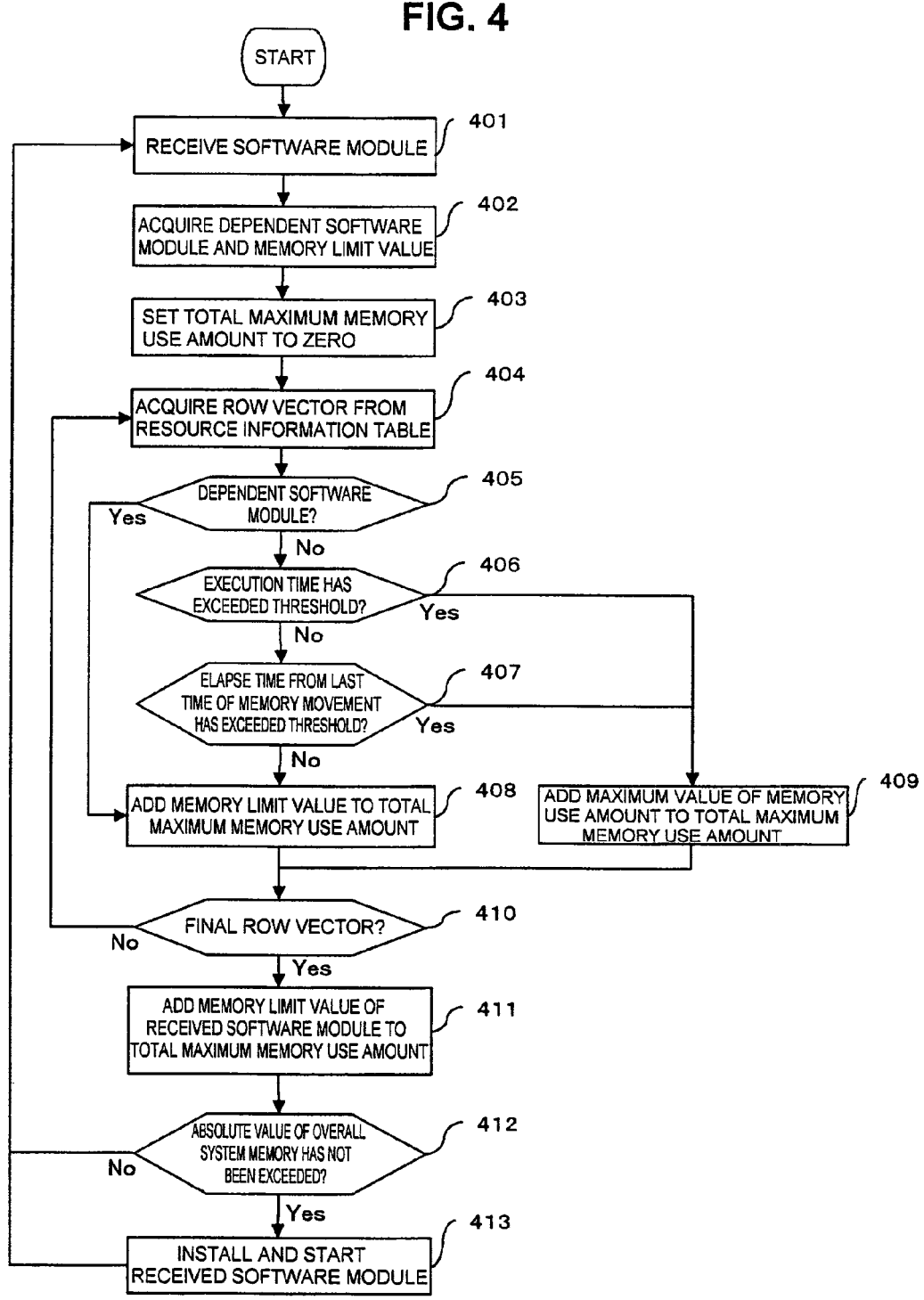
FIG. 4 is a flowchart showing the process for determining whether to enable the installation or execution of a software module.

FIG. 4 shows a flowchart for determining whether to enable the installation or execution of a software module 143 received by the software module reception unit 141 in the module management unit 142 based only on data related to memory stored in the resource information table 146. The process flow will be described below.

Step 401: The software module reception unit 141 receives a software module 143.

Step 402: The module management unit 142 acquires a dependent software module 211 and a memory limit value 212 from the metadata 201 of the received software module 143.

Step 403: A variable for storing the total value of maximum memory use amount is set to zero.

Step 404: A subsequent row vector 307 is acquired from the resource information table 146.

Step 405: If a module identifier 301 is included in the dependent software module 211 acquired from the received software module, the installation or execution of a new software module may cause increase of the maximum value of memory use amount, so the procedure advances to step 408. In other cases, the procedure advances to step 406.

Step 406: When the execution time 302 exceeds a predetermined threshold, the procedure advances to step 409. In other cases, the procedure advances to step 407.

Step 407: Elapse time is computed based on the difference between current time and last time of memory movement 303, and if the elapse time has exceeded a predetermined threshold, the procedure advances to step 409. In other cases, the procedure advances to step 408.

Step 408: A memory limit value 305 is added to the variable storing the total maximum memory use amount.

Step 409: A maximum value of memory use amount 304 is added to the variable storing the total maximum memory use amount.

Step 410: When the object is a final row vector 307 of the resource information table 146, the procedure advances to step 411. In other cases, the procedure advances to step 404.

Step 411: The memory limit value 212 of the received software module is added to the variable storing the total maximum memory use amount.

Step 412: The value of the variable storing the total maximum memory use amount is compared with an absolute value of the usable memory within the whole system, and when the value of the variable storing the total maximum memory use amount is smaller, the procedure advances to step 413. In other cases, the procedure advances to step 401 without installing the received software module.

Step 413: The received software module is installed and started.

In determining whether to enable the installation or execution of the received software module based on the limit value of resources other than the memory, the memory in the above-described flow is replaced with other resources and the flow is executed. However, step 407 is a process specific to memories, so step 407 is omitted in such cases.

Figure 5:
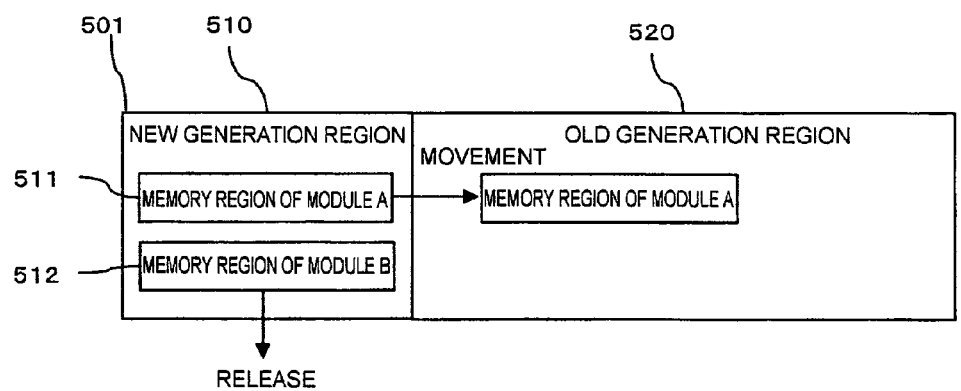
FIG. 5 is a view showing an example related to memory movement.

FIG. 5 is a view showing one example of a timing for recording the last time of memory movement 303 of the resource information table 146 shown in FIG. 1. A generational garbage collection system is widely known as a method for performing effective garbage collection in a memory region 501 used by the software modules. According to the generational garbage collection system, the memory region 501 used by the software modules is divided into a new generation region 510 and an old generation region 520. Upon allocating a new memory region to be used by the software module, a region 511 is first assigned in the new generation region 510. If the software module still uses the memory region assigned in the new generation region 510 even after garbage collection has been executed for a predetermined number of times, the memory region is moved (copied) to the old generation region 520. The present embodiment characterizes in that when the memory use amount of the software module is stabilized, the memory region 512 assigned in the new generation region 510 is released when garbage collection is executed for a predetermined number of times. When the memory region 511 assigned to the software module is moved from the new generation region 510 to the old generation region 520, the resource use monitoring unit 145 records the current time in the last time of memory movement 303 in the resource information table 146. When the elapse time from the last time of memory movement 303 is long, it is determined that the module management unit 142 is stably operating.

As described in the embodiment, the present invention can be applied not only to assembled systems but to information systems such as monitoring devices and data center appliances capable of having software installed arbitrarily and that cannot be easily restored by users when failure occurs due to exhaustion of resources.

Explanation Of References 110 remote maintenance server device
111 failure information collection unit
112 failure information data
120 software module distribution server device
121 software module registration unit
122 distributed software module storage unit
123 software module distribution unit
130 network
140 home information appliance terminal device
141 software module reception unit
142 module management unit
143 software module
144 failure information transmission unit
145 resource use monitoring unit
146 resource information table
210 metadata
211 dependent software module
212 memory limit value
220 program code
230 data resource
301 module identifier
302 execution time
303 last time of memory movement
304 maximum value of memory use amount
305 memory limit value
307 row vector
501 memory region useable by software module
510 new generation region
511 memory region assigned to software module
512 memory region assigned to software module
520 old generation region

The invention claimed is:

1. A resource management method of a system that comprises one or more software modules which individually limits a resource use amount used by each of the one or more software modules and adjusts a total of maximum resource use amounts used by the one or more software modules to be less than an entire system resource amount, wherein prior to installing and executing a new software module, the method comprises:

a first step for determining whether each of the one or more software modules already installed or being executed is stably operating according to an execution history thereof, wherein a software module is determined as stably operating when a number of times a memory region used by the software module has been moved during an amount of time is less than a predetermined number if the system is designed to move the memory region dynamically allocated to the software module via memory compaction or garbage collection;

a second step for calculating the total of maximum resource use amounts of the entire one or more software modules by adding:

maximum values of used resource amounts of the one or more software modules determined as stably operating, predetermined limit values of resource amounts of the one or more software modules determined as not stably operating, and predetermined limit values of resource amounts of dependent software modules if the new software module to be installed has a dependency relation with the one or more software modules already installed or being executed; and a third step for determining whether to enable the installation and execution of the new software module depending on whether the total of maximum resource use amounts is less than the entire system resource amount.

2. The resource management method according to claim 1, wherein
in the first step, the software module is determined as stably operating based on whether a period of time for installation or execution of the software module is longer than a predetermined period of time.

3. The resource management method according to claim 1, wherein
the resource is any one of the following: a memory, a CPU, a file open, a socket generation, a file capacity, a network bandwidth, a display screen, or anything having a limit value within a computer.

4. An embedded device which individually limits a resource use amount used by one or more software modules and adjusts a total of maximum resource use amounts used by each of the one or more software modules to be less than an entire system resource amount, the embedded device comprising:

a processor;

a resource information table which stores an execution history of the one or more software modules already installed or being executed, when installing and executing a new software module, wherein a software module is determined as stably operating when a number of times a memory region used by the software module has been moved during an amount of time is less than a predetermined number if the system is designed to move the memory region dynamically allocated to the software module via memory compaction or garbage collection; and a module management unit for determining whether the one or more software modules is stably operating according to the execution history thereof stored in the resource information table, wherein the module management unit:

calculates the total of maximum resource use amounts of the entire one or more software modules by adding:

maximum values of used resource amounts of the one or more software modules determined as stably operating, predetermined limit values of resource amounts of the one or more software modules determined as not stably operating, and predetermined limit values of resource amounts of dependent software modules if the new software module to be installed has a dependency relation with the one or more software modules already installed or being executed; and determines whether to enable the installation and execution of the new software module depending on whether the total of maximum resource use amounts is less than the entire system resource amount.

5. The embedded device according to claim 4, wherein
the module management unit determines that the software module are stably operating based whether a period of time for installation or execution of the software module is longer than a predetermined period of time.

6. The embedded device according to claim 4, wherein
the resource is any one of the following: a memory, a CPU, a file open, a socket generation, a file capacity, a network bandwidth, a display screen, or anything having a limit value within a computer.

* * * * *

UNITED STATES PATENT AND TRADEMARK OFFICE
CERTIFICATE OF CORRECTION

PATENT NO. : 8,843,934 B2  
APPLICATION NO. : 13/124917  
DATED : September 23, 2014  
INVENTOR(S) : Nakano et al.

Page 1 of 1

It is certified that error appears in the above-identified patent and that said Letters Patent is hereby corrected as shown below:

ON THE TITLE PAGE

Please add "(30) Foreign Application Priority Data" after "(65) Prior Publication Data" and before "(51) Int. Cl." as follows:

(30)      Foreign Application Priority Data

Oct. 27, 2008    (JP)................................... 2008-275145

Signed and Sealed this  
Third Day of March, 2015

Michelle K. Lee  
*Deputy Director of the United States Patent and Trademark Office*